United States Patent Office 3,382,650
Patented May 14, 1968

3,382,650
GAS FILTERS
Robert Peteri, Paris, France, assignor to Compagnie de Saint-Gobain, Neuilly-sur-Seine, France
No Drawing. Filed Dec. 24, 1964, Ser. No. 421,087
Claims priority, application France, Jan. 22, 1964, 961,153
8 Claims. (Cl. 55—97)

ABSTRACT OF THE DISCLOSURE

Amorphous trihydrated alumina (gibbsite) is mixed with mineral fibers such as glass and asbestos to produce a filter.

---

This invention relates to the manufacture of filters, particularly to filters which are useful in extracting solids of minute dimensions from gases at high temperature, the particles in which are extremely fine, for instance being on the order of one-tenth micron.

The filtration of such gases is extremely difficult because the filter must have a combination of properties which are difficult to attain in one material, for instance, incombustibility, chemical inertia, mechanical strength particularly at high temperature, efficiency sufficient to stop the finest particles, and low loss of head in order that the establishment of substantial differences in pressure, upstream and downstream of the filter, which reduces the flow of gas, shall not increase the energy required for the filtering process or rupture the filter. Many attempts have been made to produce each filtering materials and the best of these have been those which are composed solely of mineral fibers, particularly glass and asbestos, to which have been added powdery substances which reduce the dimensions of the pores in the filter and bind the fibers together. Some of such filters have been very effective in filtration but have lacked mechanical strength particularly when the temperature of the gas being filtered reaches or exceeds 400° C. in continuous service. Such filters have generally been made with accordion pleats for the usual reasons but the pleating operation has had an effect on the strength of the resulting product.

It is an object of the present invention to prepare filter material which meets all the requirements which have been listed above and which can be successfully used continuously not only at low temperatures but at temperatures between 400 and 800° C. and even at temperatures higher than that. The objects of the invention are accomplished as to process by the method of making a filter which consists essentially of intimately slurrying at least one of a group of fibers consisting of glass and asbestos fibers with film forming, amorphous gibbsite which shows incipient crystallization and has a specific surface between about 100 and 200 m.$^2$/g., and forming a filter from the slurry. The novel product is a filter consisting essentially of at least one of the group of compounds consisting of glass and asbestos fibers, and amorphous, trihydrated alumina. The particular form in which the filters are made is composed essentially of an intimate slurry of mineral fibers, among which glass, asbestos or both are preferred, and that particular trihydrated alumina which is called gibbsite or hydrargillite. There are several types of this material, some of which are amorphous and some of which are crystalline. The amorphous type is used and that is preferred which shows incipient crystallization. There is also a difference in the specific surface of the forms of gibbsite. Those which are crystalline do not readily produce colloid suspensions, are not film forming, and have a specific surface less than about 70 m.$^2$/g. The gibbsites which are employed in this invention have a specific surface of between 100 and 200 m.$^2$/g. and produce stable colloid solutions in water which are film forming. The gibbsites which have a specific surface above 200 m.$^2$/g. are unsatisfactory. Thus the gibbsites having a specific surface of 10 to 70 m.$^2$/g. do not produce film-forming colloid suspensions and other hydrated aluminas, for instance the monohydrated, may yield film-forming suspensions but have a specific surface which is too high to be effective.

The glass fibers may be of any current quality having a length between about 2 and 6 mm. and a diameter from about 1 to 6 microns. If the average length of these fibers is less than 1 mm. inferior results are produced. One may use mixtures of glass fibers of different diameters in different proportions, computed by weight with respect to the total weight of the glass fibers, as follows: 0 to 95% of fibers of 1.5 micron; 0 to 90% of fibers of 3 microns; and 0 to 50% of fibers of 6 microns. In this composition the maximum percentages given are limits but the compositions are otherwise exemplary.

The asbestos may constitute from 5 to 30% by weight of the mixture of glass and asbestos. In such mixtures the asbestos aids in uniformly distributing the glass fibers throughout the filtering material and holds them in place.

The mineral fibers receive the amorphous gibbsite and when the mixing of the three constituents has been completed the filter is formed from the slurry by the usual operations employed in making paper. According to an advantageous technique, an ordinary beating engine of the type used in paper making receives a charge of water and asbestos, the asbestos being beaten for 1 to 6 hours. Thereafter the glass fibers are added to the slurry and the beating continues for 5 to 10 minutes, being stopped before the length of the glass fibers is reduced below 1 mm. Into the mineral slurry thus produced the amorphous gibbsite is poured, preferably as a dispersion in water, which can be produced by prolonged agitation. The concentration of that dispersion can vary within large limits but can be satisfactory within 5 to 10% by weight. The dispersion is preferably made in pure water of low hydrotimetric degree. The proportion of gibbsite introduced with respect to the fibrous material varies from 3 to 20% by weight, the percentage being computed on gibbsite which has been dried at 105 ± 3° C. and on the weight of the mineral fibers. The slurry thus obtained is made into paper on the usual paper making machines. This product is paper like and has chemical resistance, high mechanical strength, and high filtration efficiency even at temperatures from 400 to 800° C. and above. This material captures all solid particles which have dimensions equal to or superior to .1 micron without creating a loss of head greater than the filter papers which are combustible and which are destroyed at these temperatures.

Such filters are customarily pleated before being introduced into the filter line and the pleating, which is done by machine, subjects the material to mechanical effects which are particularly severe at the crests of the ridges. The pleating is done in the cold and to improve the resistance of the material to bending and to facilitate its handling, flexible artificial resin such as polyvinyl acetate and a convenient plasticizer for it can be introduced. This resin can be introduced as an aqueous emulsion which can be added to the dispersion in the beating engine up to 7% of polyvinyl acetate, computed by weight on the dry inorganic ingredients, the final retention on the filter material being about 5%. This artificial resin has no effect during filtration by hot gas because it is totally eliminated at the start of the process by the temperature of the gas.

In the following examples are illustrations of the process and the product, a recitation of qualities, and a comparison with filters composed of glass and asbestos fibers which do not use the amorphous gibbsite.

Example 1

6.9 kgs. of asbestos which has been separated and cleaned is dispersed in water in a typical beating engine of the type used in paper making. After beating for an hour the volume is increased to 3000 liters and there are added 21 kgs. of glass fibers of a mean diameter of 3 microns and 3 kgs. of textile glass fibers of a diameter of 3 microns cut to lengths of 12.5 mm. During the homogenization of the dispersion, which takes 5 to 10 minutes there is added 3.6 kgs. of an emulsion of polyvinyl acetate, 6% tricresyl phosphate in about 20 liters of water and 10 kgs. of amorphous gibbsite in a filter cake of which the dry weight is 30% dispersed in about 60 liters of water, the slurry is made into a paper sheet 100 to 110 m.$^2$/g. by the usual paper making methods. This filter has the following characteristics: efficiency of filtration for particles of methylene blue of .1 micron, above 99.9%; loss of head in a gaseous current moving 4 cm. per second, 52 mm. of water; breaking strength by Afnor Test Q 03001, 1.2 kg.

The same paper after prolonged use for several hours at a temperature of 450° C. had the same efficiency, showed a loss of head of 43 mm. of water and a breaking strength of .4 kg.

In order to compare these results with the filters which are made from glass fibers, asbestos fibers and calcium silicate, such papers were made and tested, showing an initial efficiency above 99.9%, a loss of head of 50 mm. of water and a rupture strength of 1.6 kg. After exposure for only 15 minutes, far less than that of the new filter, to gases at a temperature of 450° C. the breaking strength fell to .1 kg. and by reason of the great fragility of the sheet the tests of efficiency and loss of charge could not be made.

Example 2

A filtering material was prepared as in Example 1 but replacing 21 kgs. of glass fiber of 3 microns diameter with an equal quantity of glass fibers at 1.5 microns in diameter. The filter paper thus produced had a thickness corresponding to 100 to 110 m.$^2$/g. and the following characteristics: efficiency superior to 99.9%; loss of head at a speed of 4 cm. per second, 51.5 mm. of water; breaking strength of 1.2 kgs. After several hours use at a temperature of 450° C.: efficiency superior to 99.9%; loss of head at 4 cm. per second, 46.5 mm. of water and breaking strength of .4 kg.

An increase of the temperature to 800° C. did not change the characteristics of filtration but increased the breaking strength which became .6 kg.

A filter paper of commerce containing the same fibrous elements but using another inorganic binder, when made to the same dimensions produced the following results: efficiency 99.8%; loss of head at a speed of 4 cm. per second, 43 mm. of water; breaking strength by the same test 1.7 kg. After 15 minutes use at 450° C. the breaking strength dropped to .05 kg. and no control of filtration could be achieved.

The new filtering material is superior in efficiency and in its strength to any filter known to the applicant, especially after use at temperatures above 400° C. The preferred form of filter is one in which both mineral fibers are used but filters in which only one of the fibers, glass or asbestos, are used can be made and are superior to those which were previously made using other binding agents. The process is novel and can be carried out by machinery of the type which is known in the paper making industry.

As many apparently widely different embodiments of the present invention may be made without departing from the spirit and scope thereof, it is to be understood that the invention is not limited to the specific embodiments.

What is claimed is:

1. A filter material comprising 3–20% by weight of film forming, amorphous trihydrated alumina having a specific surface between about 100 and 200 m.$^2$/g. and at least one material from the group consisting of glass fibers averaging at least 1 mm. in length, and asbestos fibers.

2. A filter according to claim 1 in which the glass fibers have an average length of 2 to 6 mm. and an average diameter of 1 to 6 microns.

3. A filter according to claim 1 in which the filter contains about 5 to 30 parts by weight of asbestos fibers in each 100 parts of a mixture of glass and asbestos fibers.

4. A filter according to claim 1 in which up to about 95% of the glass fibers of the filter are about 1.5 microns in diameter.

5. A filter according to claim 1 in which up to about 90% of the glass fibers of the filter are about 3 microns in diameter.

6. A filter according to claim 1 in which up to about 50% of the glass fibers are about 6 microns in diameter.

7. A filter according to claim 1 in which the amorphous trihydrated alumina is gibbsite having a specific surface of between 100 and 200 m.$^2$/g., producing stable colloid solutions, forming film and showing incipient crystallization.

8. A method of filtering gas at a temperature of about 400 to about 800° C. which comprises passing the gas through a filter consisting essentially of glass and asbestos fibers and amorphous gibbsite having a specific surface between about 100 and 200 m.$^2$/g. which shows incipient crystallization, the glass fibers averaging at least 1 mm. in length and the gibbsite constituting about 3–20% by weight with respect to the fibrous material.

References Cited

UNITED STATES PATENTS

| 2,235,089 | 2/1966 | Burroughs | 210—506 |
|---|---|---|---|
| 3,246,767 | 4/1966 | Pall et al. | 210—505 |

OTHER REFERENCES

Hackh's Chemical Dictionary, McGraw-Hill, 1944, third edition, p. 39.

LEON D. ROSDOL, *Primary Examiner.*

I. GLUCK, *Assistant Examiner.*